(No Model.)
J. ZIMERMAN.
HARROW.
No. 360,640. Patented Apr. 5, 1887.
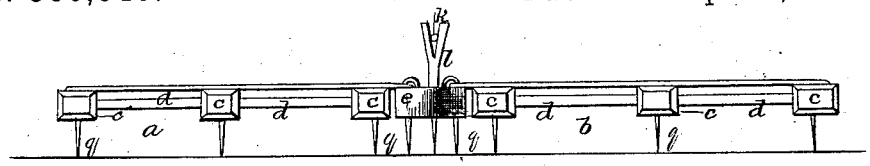
Fig. 2.
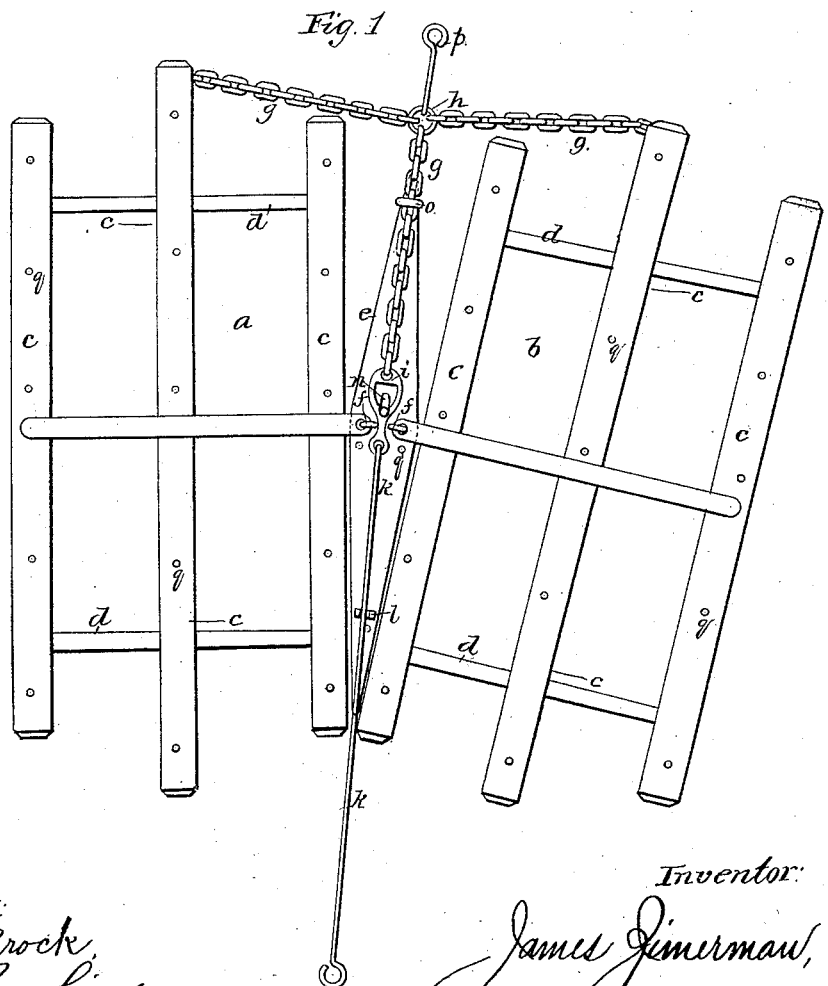
Attest:
L. B. Brock,
A. C. Rawlings.
Inventor:
James Zimerman,
by F. B. Brock
atty.

UNITED STATES PATENT OFFICE.

JAMES ZIMERMAN, OF PAMELIA FOUR CORNERS, NEW YORK.

HARROW.

SPECIFICATION forming part of Letters Patent No. 360,640, dated April 5, 1887.

Application filed January 24, 1887. Serial No. 225,360. (No model.)

*To all whom it may concern:*

Be it known that I, JAMES ZIMERMAN, a citizen of the United States, residing at Pamelia Four Corners, in the county of Jefferson and State of New York, have invented certain new and useful Improvements in Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 represents a plan view of a harrow to which I have applied my improvements. Fig. 2 represents a detail rear elevation of the same.

My invention relates to harrows.

The object of my improvement is to provide a two-part harrow with a swinging device whereby the relative position of the two parts is changed, so that the teeth may traverse the ground to be harrowed in one position when the harrow is traveling in one direction and in a different relative position when the harrow is retracking the ground previously gone over.

My invention consists in the following construction and combination of parts, which will be first fully set forth and described, and the points of novelty then pointed out in the claim.

In the drawings, $a$ and $b$ represent two harrow-frames, of the usual construction, made of a series of longitudinal beams, $c$, and provided with transverse braces $d$, which serve to hold the frames rigidly together.

$e$ is a lozenge or diamond shaped center beam or frame of the shape shown in the drawings.

$ff$ are two pivots or bearings centrally arranged upon the beam $e$. The central transverse bars $d$ are prolonged at their inner ends and pass over the bearings $ff$, and are pivoted thereto; so the harrows $ab$ have an oscillating movement about the bearings $ff$ as a center.

$g$ is a chain composed of three parts, united to the central ring, $h$. It is secured to the central longitudinal beam of each harrow and to a link, $i$.

$k$ is a rod or handle secured to link $i$ on rear end of chain $g$.

$l$ is a forked rest, upon which the rod $k$ rests.

$n$ is a hook or projection, over which the link $i$ is placed when the forward end of the harrow is spread apart in its operation.

$o$ is a staple or guide on the forward end of the lozenge-shaped beam $e$ for guiding the draft-chain to which the link $i$ is attached.

$p$ is the draft chain or rod, secured to the ring $h$.

$q$ are the harrow-teeth. They are secured both to the diamond-shaped beam and to longitudinal beams $c$ of both harrows.

The harrows on both sides of the diamond-shaped beam are arranged to rock or oscillate, so as to bear against the sides of the forward end of beam $e$ or against its rear converging sides, as will be described in connection with the following statement of the operation of the improved harrow:

When the link $i$ is taken off the hook $n$ and the draft is applied, the link $i$ is drawn forward to or through the guide or staple $o$, and the chains $g$, attached to the forward ends of the harrows $ab$, are brought under tension. The forward ends of the harrow are thus brought together and lie along the converging sides of the forward end of the diamond-shaped beam $e$. In this position the teeth of the harrow each take a separate track on the ground. If it should be desired to draw the rear ends of the harrow together, (as when retracking a piece of ground previously gone over with the forward ends drawn together,) the link $i$ and chain $g$ are pulled back and the link placed over the hook $n$, which brings all the draft on the hook and central chain and off the chains leading from the ring $hh$ to the harrows $ab$. In the latter position the resistance offered to the harrows causes their rear ends to be brought together and lie along the converging sides of the rear of the beam $e$. The pull or draft in this case is from the center of the harrow or beam $e$.

A more thorough pulverization of the soil is obtained by the use of my harrow than is possible with the old simple forms of harrows.

Having described my invention, what I claim as new, and desire to secure by Letters Patent of the United States, is—

In a harrow, the combination of a lozenge-shaped central beam or frame, a harrow-frame pivoted on each side thereof, and a draft chain or mechanism attached to the harrow-frames and central beam, whereby the forward and rear ends of the harrow-frames may be swung toward each other.

In testimony whereof I affix my signature in presence of two witnesses.

JAMES ZIMERMAN.

Witnesses:
WARREN A. WHITE,
G. A. BARON.